UNITED STATES PATENT OFFICE.

SAMUEL MAXWELL, OF BALTIMORE, MARYLAND.

COMPOSITION FOR REMOVING GUM FROM MACHINERY.

Specification forming part of Letters Patent No. 28,001, dated April 24, 1860.

*To all whom it may concern:*

Be it known that I, SAMUEL MAXWELL, of the city and county of Baltimore, and State of Maryland, have discovered certain new and useful Composition of Materials for Removing Gummy Matter from Machinery, &c.; and I do hereby declare that the following is a full, clear, and exact description of the same.

In the employment of oil or fatty matter for lubricating machinery it very frequently occurs that in the intervals of using said machinery a gummy matter is formed and hardened as to interfere materially with the working of the same. This peculiarity occurs in machinery exposed to the influence of sea-air, salt-water, &c.—as in pulleys of tiller-chains, screws, &c., on vessels. To remove this gum by scraping is attended with expense and inconvenience, and to remove it by potash or soda subjects the article to rust. My improvement, therefore, is designed and does effect the removal of the gum, and at the same time keeps the article to which it is applied bright and clean, serving, still further, as a lubricator.

The composition is as follows: For a cask of thirty gallons, take thirty pounds quicklime, one pound calcined magnesia, one pound flowers of sulphur, one pound powdered French chalk, one-fourth pound hartshorn, (carbonate ammonia,) and one-half pound chloride of lime. Put these materials in a thirty-gallon barrel and add about fifteen gallons of water. Let it stand about twenty-four hours, being well stirred during that time. Then add eight gallons whale-oil and seven gallons of melted tallow or other fat. Mix well together and it is ready for use.

In the application of the composition for removing the gum, after shaking the material well in a bottle or other suitable vessel, the journal, screw, or cog-wheels are annointed therewith. The gum soon becomes soft and semi-fluid, and may be wiped off with tow or waste-cotton, leaving a sufficiency of the composition to lubricate the screw or journal. If desirable to use pure oil, &c., on the journals, &c., it may be applied without being affected by the previously-applied composition.

Having described the character of my improvement, what I claim as my invention, and desire to secure by Letters Patent, is—

The composition of ingredients and the process of admixture thereof, substantially as set forth, and for the purposes specified, of removing gummy matter from machinery, &c.

In testimony whereof I have hereunto signed my name before two subscribing witnesses.

SAMUEL MAXWELL.

Witnesses:
JOHN F. CLARK,
EDM. F. BROWN.